US010664992B2

(12) United States Patent
Zhang et al.

(10) Patent No.: US 10,664,992 B2
(45) Date of Patent: May 26, 2020

(54) NON-CONTACT VISUAL DETECTION METHOD FOR MARK POSITIONING OF MOBILE PHONE TOUCH SCREEN

(71) Applicant: Jiangnan University, Wuxi (CN)

(72) Inventors: Xiangsheng Zhang, Wuxi (CN); Fujiang Wang, Wuxi (CN); Feng Pan, Wuxi (CN)

(73) Assignee: JIANGNAN UNIVERSITY, Wuxi, Jiangsu Province (CN)

( * ) Notice: Subject to any disclaimer, the term of this patent is extended or adjusted under 35 U.S.C. 154(b) by 0 days.

(21) Appl. No.: 16/463,344

(22) PCT Filed: Apr. 26, 2018

(86) PCT No.: PCT/CN2018/084592
§ 371 (c)(1),
(2) Date: May 22, 2019

(87) PCT Pub. No.: WO2019/136882
PCT Pub. Date: Jul. 18, 2019

(65) Prior Publication Data
US 2020/0105012 A1    Apr. 2, 2020

(30) Foreign Application Priority Data

Jan. 13, 2018  (CN) .......................... 2018 1 0038267

(51) Int. Cl.
*G06F 3/041* (2006.01)
*G06T 7/73* (2017.01)
(Continued)

(52) U.S. Cl.
CPC .............. *G06T 7/74* (2017.01); *G05B 19/05* (2013.01); *G06F 3/041* (2013.01);
(Continued)

(58) Field of Classification Search
CPC ...... G06F 3/04812; G06F 3/0418; G06T 7/80
See application file for complete search history.

(56) References Cited

U.S. PATENT DOCUMENTS

| 10,372,320 B2* | 8/2019 | Dong ................. G06F 3/04883 |
| 2014/0160073 A1* | 6/2014 | Matsuki ............... G06F 3/0485 345/174 |

(Continued)

FOREIGN PATENT DOCUMENTS

| CN | 102890576 A | 1/2013 |
| CN | 103616972 A | 3/2014 |

*Primary Examiner* — Rowina J Cattungal
(74) *Attorney, Agent, or Firm* — Muncy, Geissler, Olds & Lowe, P.C.

(57) ABSTRACT

A non-contact visual detection method for Mark positioning of mobile phone touch screen. The method divides the touch screen detection part of the mobile phone into two areas A and B. The black-and-white industrial camera takes phase detection, and the B-zone Mark and Circle are phase-detected by the second black-and-white industrial camera. After taking the picture, the image acquisition module collects the image and transmits the image information to the upper computer module. The upper computer module processes the data, and the image processing algorithm detects the deviation distance between the Mark center point and the Circle center, displays the detection result and gives the completion signal, after which The motion control module returns to the initial position and waits for the next workpiece detection. The detection method can realize fast, accurate and automatic detection of the mobile phone touch screen Mark positioning.

2 Claims, 3 Drawing Sheets

(51) Int. Cl.
  *H04N 5/247*   (2006.01)
  *H04N 5/225*   (2006.01)
  *G06T 5/00*    (2006.01)
  *G06T 7/80*    (2017.01)
  *G06T 7/00*    (2017.01)
  *H04M 1/02*    (2006.01)
  *G06F 13/42*   (2006.01)
  *G05B 19/05*   (2006.01)

(52) U.S. Cl.
  CPC .......... *G06F 13/4221* (2013.01); *G06T 5/006* (2013.01); *G06T 7/0004* (2013.01); *G06T 7/80* (2017.01); *H04M 1/0266* (2013.01); *H04N 5/2256* (2013.01); *H04N 5/247* (2013.01); *G05B 2219/1132* (2013.01); *G06F 2203/04103* (2013.01); *G06F 2213/0024* (2013.01); *G06T 2207/30164* (2013.01); *G06T 2207/30204* (2013.01); *H04M 2250/22* (2013.01)

(56) References Cited

U.S. PATENT DOCUMENTS

| | | | |
|---|---|---|---|
| 2015/0205522 A1* | 7/2015 | Zeng | G06F 3/04886 |
| | | | 715/847 |
| 2016/0196034 A1* | 7/2016 | Chen | G06F 3/04812 |
| | | | 715/856 |
| 2017/0010806 A1* | 1/2017 | Pingco | G06F 3/04886 |
| 2017/0192511 A1* | 7/2017 | Lawrenson | H04N 5/232 |
| 2017/0293670 A1 | 10/2017 | Wang et al. | |

\* cited by examiner

NON-CONTACT VISUAL DETECTION METHOD FOR MARK POSITIONING OF MOBILE PHONE TOUCH SCREEN

TECHNICAL FIELD

The present invention belongs to the field of electronic product detection technology, and relates to a visual detection method for electronic products, in particular to a non-contact visual detection method for Mark positioning of mobile phone touch screen.

BACKGROUND

With the rapid development of mobile Internet, the software and hardware technologies of smart phones have been rapidly improved, and the price has also developed towards more and more civilians, making the development of smart phones more diversified in China. It is also becoming more and more comprehensive and plays an extremely important role in people's intelligent life.

As an important part of smart phones, improving the production pass rate of the touch screen and the production quality of the mobile phone is a very important part of the popularization of the mobile phone. The Mark center point of the unqualified touch screen is quite different from the Circle center, which causes a large exposure problem on the front of the product. Traditional touch screen Mark detection adopts semi-automatic measurement method with manual participation. Due to the instability of manual placement, the detection station changes too much, which leads to inaccurate detection and low efficiency, and the degree of automation and stability are not high enough.

FIG. 3 is a schematic diagram of the touch screen to be detected. There are 4 flag positions, which are Leftmark, Rightmark, Leftcircle and Rightcircle. It is necessary to detect the deviation distance between the Mark center point and the Circle center in Area A, and the deviation distance between the Mark center and the Circle center in Area B in order to judge whether the touch screen is qualified or not.

SUMMARY

In order to solve the technical problems mentioned above, the invention provides a non-contact visual detection method based on machine vision for Mark positioning of mobile touch screen.

The technical solution adopted by the invention is:

A non-contact visual detection method for Mark positioning of mobile phone touch screen, and the steps are as follows:

Step 1: Attach a plastic film on the tray platform, fix two small iron blocks on the left side of the touch screen and a small iron block on the top.

Step 2: The detection part of touch screen of mobile phone is divided into two parts: area A is detected by the first black-and-white industrial camera 1 and area B is detected by the second black-and-white industrial camera 2. The Mark and Circle of area A are imaged by the first black-and-white industrial camera 1, and the Mark and Circle of area B are imaged by the second black-and-white industrial camera 2. The two black-and-white industrial cameras first take the image of Mark flag positions and then take the image of the Circle. By the way, the distance between the two black-and-white industrial cameras and the detection plane is kept in the range of 1090-1100 mm.

Step 3: The first black-and-white industrial camera 1 detects the image Mark 1 and Circle1 displayed by the upper computer, and the second black-and-white industrial camera 2 detects the image Mark 2 and Circle2 displayed by the upper computer. The detection methods of the deviation between Mark center point and Circle center are as follows:

1) The invention uses a nonlinear correction mode to calibrate images acquired by black and white industrial cameras, mainly corrects perspective distortion, radial distortion and plane linear distortion. First, select the invariant features on the image for coarse positioning of the product, and then obtain the coordinate position of the selected feature by coarse positioning and establish its coordinate relationship with the fitted straight line search area, and finally use the least squares method in the corresponding fitted line search area to fit the two ends of the touch screen Mark in order to obtain the center point a and the center point b;

2) The invention uses a nonlinear correction mode to calibrate images acquired by black and white industrial cameras, mainly corrects perspective distortion, radial distortion and plane linear distortion. First, select the invariant features on the image for coarse positioning of the product, and then obtain the coordinate position of the selected feature by coarse positioning and establish its coordinate relationship with the fitted straight line search area, and finally use the least squares method in the corresponding fitted line search area to fit the touch screen to get the center c of Circle in area A and the center d of Circle in area B.

3) Taking the line passing through the center point a and b as the X-axis and the vertical line passing through the center point a as the Y-axis. The coordinates of the two pairs of Mark marks are unified in one coordinate system, and the coordinates of the four points are obtained, so as to obtain the relative deviation position between the Mark point and the Circle.

The invention has the advantages that: it can realize the fast, accurate and automatic detection of the Mark position of the mobile touch screen. The visual processing system and pneumatic valve control module are connected by I/O communication, which facilitates the configuration, upgrade and maintenance of the system and improves the reliability and stability of the software.

In the figure: 1 first black-and-white industrial camera; 2 second black-and-white industrial camera; 3 purple coaxial light source A; 4 purple coaxial light source B; 5 telecentric lens A; 6 telecentric lens B; 7 touch screen; 8 tray for placing touch screen; 9 industrial control computer; 10 display screen; 11 PLC; 12 pneumatic valve controller.

Figure 1:
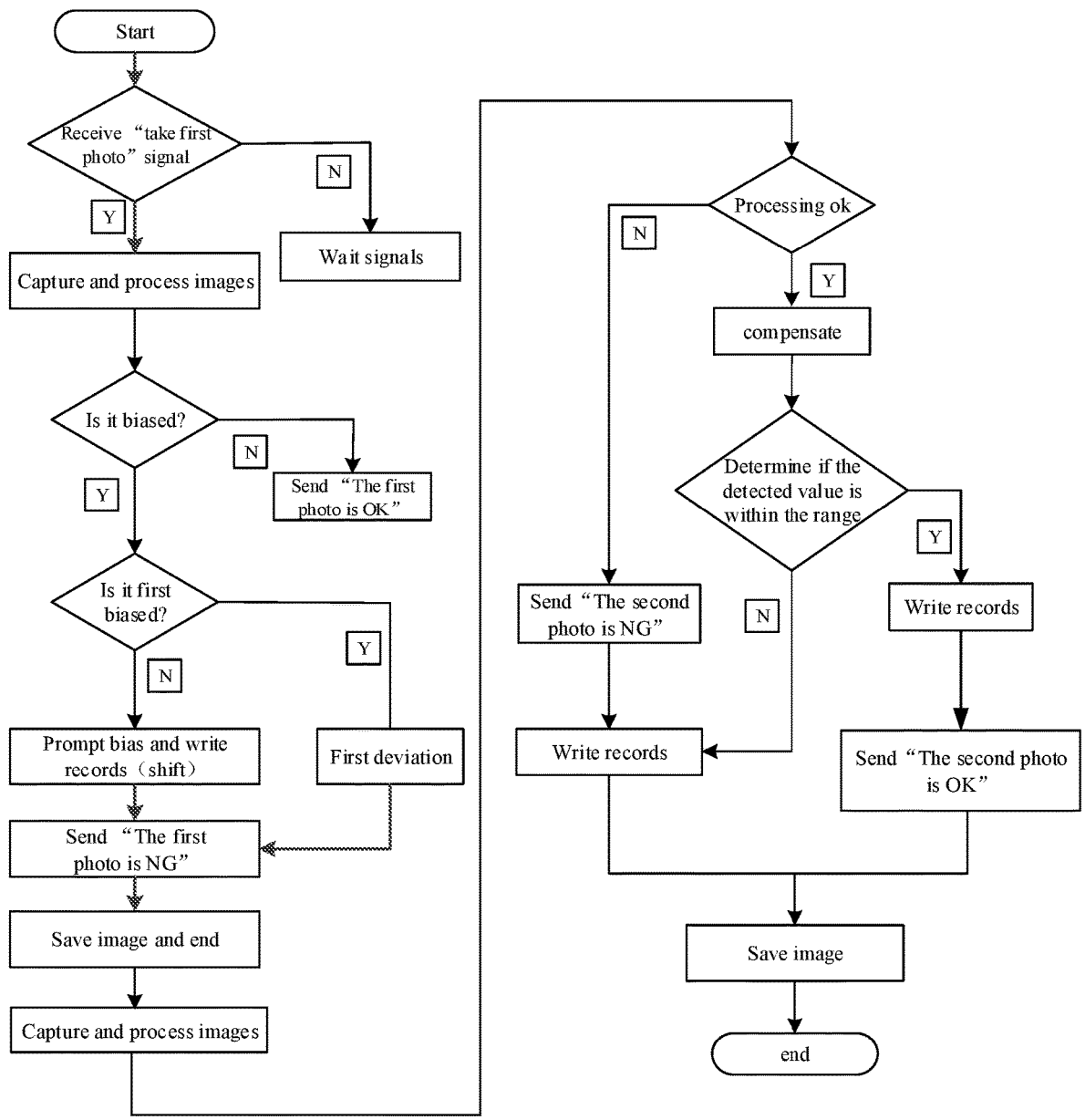
FIG. 1 is a flow chart of a non-contact visual inspection operation of a mobile phone touch screen Mark positioning.
Figure 2:
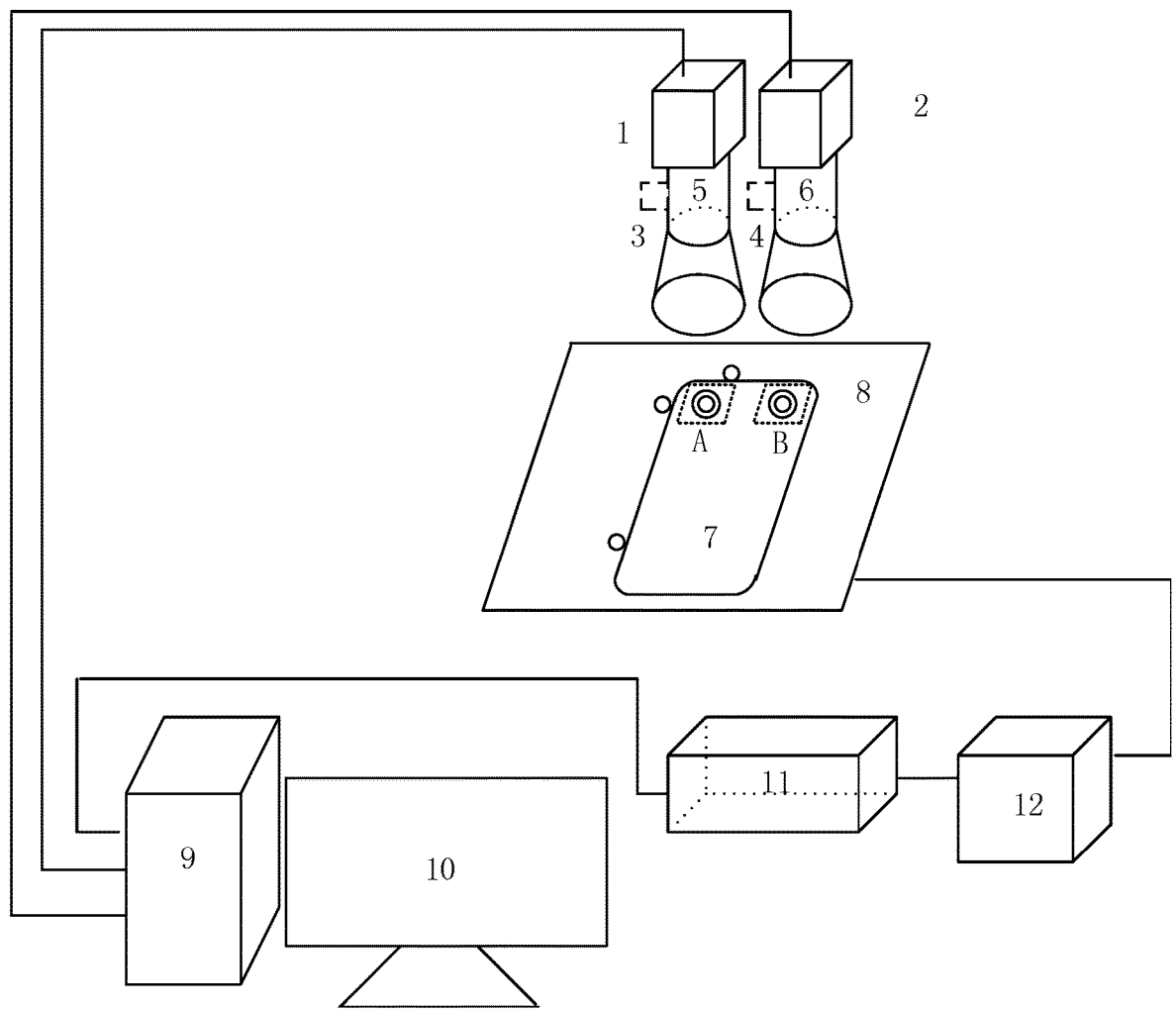
FIG. 2 is a schematic diagram of a non-contact visual detection device for mobile phone touch screen Mark positioning.
Figure 3:
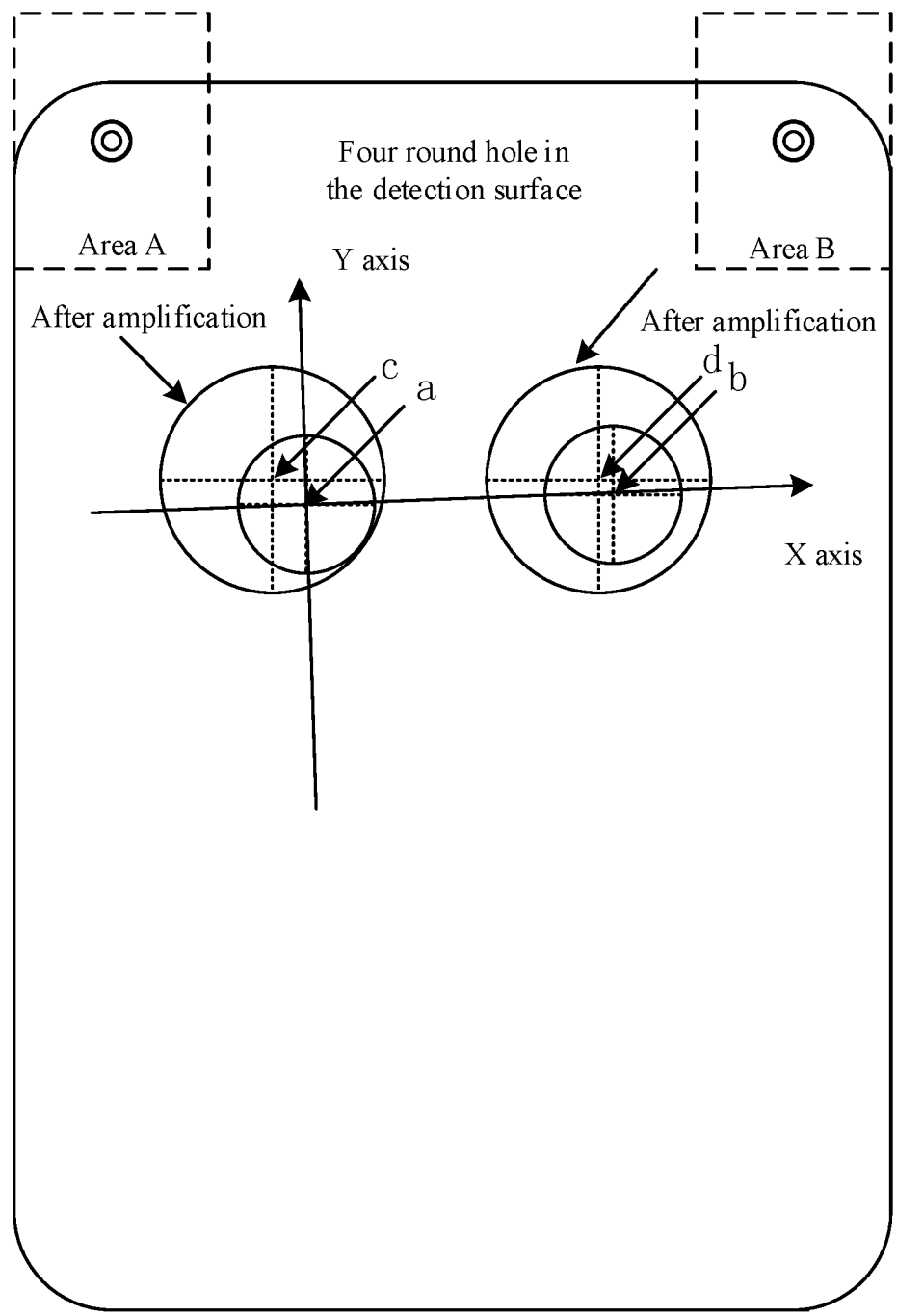

FIG. 3 is a schematic diagram of the touch screen detection area.

DETAILED DESCRIPTION

The following is a further description of the specific embodiments of the present invention in connection with the technical scheme and the drawings.

Example 1 the Process of Acquiring Images

A mobile phone touch screen Mark positioning non-contact visual detection device includes image acquisition module, motion control module, auxiliary equipment module, pneumatic valve control module and upper computer module. There are two image acquisition modules, which are composed of black-and-white industrial camera, telecentric lens, purple coaxial light source and data acquisition card. The telecentric lens is installed on the black-and-white industrial camera, and the purple coaxial light source is installed inside the telecentric lens. Each telecentric lens is 1090-1100 mm away from the Mark flag of the mobile phone touch screen; the two black-and-white industrial cameras are installed in PCI slot of industrial control computer through Gige Ethernet communication connection for data acquisition. The motion control module is composed of relay switch, PLC and position sensor; the industrial control computer and PLC are connected by I/O communication; and the auxiliary equipment module includes pallet, bracket and shield. The pneumatic valve control module consists of pneumatic valve controller, pneumatic valve, gas pipe, barometer, pneumatic pump and tray. The pneumatic valve drives the tray to move up and down two workstations and the upper and lower workstations acquire Mark and Circle images respectively for subsequent processing. The upper computer module mainly displays four deviation data of the touch screen, the compensation value of the equipment, two Mark images and two Circle images.

When starting the test, place the touch screen of the mobile phone on the tray first, then adjust the position of the two black and white industrial cameras and connect the IP address to make the picture in the center of the 10 image window of the display screen 10. It is also necessary to ensure the consistency between the images taken by black and white industrial cameras and the corresponding image windows. PLC11 carries the product to Mark detection position through pneumatic valve controller 12. When the position is reached, PLC11 sends a bit signal to the display screen 10 through I/O communication. The display screen 10 triggers the first black-and-white industrial camera 1 and the second black-and-white industrial camera 2 to take photos. After obtaining the image, according to the clarity of the image, adjust the focal length of two black and white industrial cameras appropriately until a clear image can be taken, otherwise it will affect the search for the center of the circle in the later period. The specific steps are as follows: firstly, load the address and model of two black and white industrial cameras with vision software, then adjust the upper and lower four directions of the black and white industrial camera to ensure that the captured image is in the center of the upper computer display. When the requirements are met, adjust the focus of the black and white industrial camera, as far as possible to make the captured image of Mark clear enough.

Example 2 Obtaining Image Post Processing (1) Select the grid 0.5 mm*0.5 mm checkerboard calibration plate to calibrate black and white industrial camera images, and use the nonlinear correction mode to correct the perspective distortion, radial distortion and plane linear distortion; The specific steps are as follows: place the calibration board in the opposite direction firstly, then open the real-time image module of the two black-and-white industrial cameras by visual software to calibrate the device. After that, generate the calibration files of the first black and white industrial camera 1 and the second black and white industrial camera 2, finally, load the calibration files into the corresponding PC module respectively;

(2) Capture the image and search for the template to locate it. The image function of the coarse positioning of the product is trained offline by using the positioning function, and the coordinates of the image feature are found by the feature matching algorithm, and the position information of the fitted circle search area is calculated according to the coordinate correspondence between the image feature and the fitted circle search area;

(3) Image processing. Using the least squares method in the corresponding fitted line search area to fit the four boundaries of Mark at both ends of the touch screen, so that the coordinates of two intersecting points (X1, Y1) and (X2, Y2) can be obtained and the coordinates of Mark's central point can be calculated by the following formula:

At the same time, fit the Circle image at both ends of the touch screen in the corresponding fit circle search area by least squares method. So that the center C of Circle and the center D of Circle can be obtained. Then make a straight line through the center points a and b as the X-axis of coordinates, and make the vertical line of the center point a about the X-axis as the Y-axis. Finally the mark in Area A and mark in Area B are unified in a coordinate system, and the coordinates of four points are obtained, so that the relative deviation position between Mark point and Circle can be obtained subsequently;

Because there is a part of human error in the non-contact testing equipment, the compensation value of the equipment should be obtained in the first round of testing, and the compensation value should be input into the host computer to ensure the accuracy of the subsequent measurement data. The upper computer can display the results of data deviation and image acquisition in real time. It can also record the data generating report in the upper computer and give the signal of detection completion to the PLC. The PLC carries the product to another station through the pneumatic valve controller, which is detecting the center of Circle. The pneumatic valve controller drives the tray back to its original position after taking the image, and prepares for the detection of the next work piece.

The invention claimed is:
1. A non-contact visual detection method for Mark positioning of mobile phone touch screen, wherein the device used is a non-contact visual detection device for mobile phone touch screen Mark positioning, including image acquisition module, motion control module, auxiliary equipment module, pneumatic valve control module and upper computer module; there are two image acquisition modules, which are composed of black-and-white industrial camera, telecentric lens, purple coaxial light source and data acquisition card; the telecentric lens are installed on the black-and-white industrial camera, and the purple coaxial light source is installed inside the telecentric lens; each telecentric lens is 1090-1100 mm away from the Mark of the mobile touch screen; the two black-and-white industrial cameras are installed in PCI slot of industrial control computer through Gige Ethernet communication connection for data acquisition; the motion control module is composed of relay switch, PLC and position sensor; the industrial control computer and PLC are connected by I/O communication; and the auxiliary equipment module includes pallet, bracket and shield; the pneumatic valve control module consists of pneumatic valve controller, pneumatic valve, gas pipe, barometer, pneumatic pump and tray; the pneumatic valve drives the tray to move up and down two workstations and the upper and lower workstations acquire Mark and Circle images respectively for subsequent processing; the upper computer module mainly displays four deviation data of the touch screen, the compensation value of the equipment, two Mark images and two Circle images;

the specific steps are as follows:

step 1: attach a plastic film on the tray platform, fix two small iron blocks on the left side of the touch screen and a small iron block on the top;

step 2: the detection part of touch screen of mobile phone is divided into two parts: area A is detected by the first black-and-white industrial camera and area B is detected by the second black-and-white industrial camera; the Mark and Circle of area A are imaged by the first black-and-white industrial camera, and the Mark and Circle of area B are imaged by the second black-and-white industrial camera; the two black-and-white industrial cameras first take the image of Mark flag positions and then take the image of the Circle;

step 3: the first black-and-white industrial camera detects the image Mark 1 and Circle1 displayed by the upper computer, and the second black-and-white industrial camera detects the image Mark 2 and Circle2 displayed by the upper computer; detection methods of the deviation between Mark center point and Circle center are as follows:

the invention uses a nonlinear correction mode to calibrate images acquired by black and white industrial cameras, mainly corrects perspective distortion, radial distortion and plane linear distortion; first, select the invariant features on the image for coarse positioning of the product, and then obtain the coordinate position of the selected feature by coarse positioning and establish its coordinate relationship with the fitted straight line search area, and finally use the least squares method in the corresponding fitted line search area to fit the two ends of the touch screen Mark in order to obtain the center point a and the center point b;

the invention uses a nonlinear correction mode to calibrate images acquired by black and white industrial cameras, mainly corrects perspective distortion, radial distortion and plane linear distortion; first, select the invariant features on the image for coarse positioning of the product, and then obtain the coordinate position of the selected feature by coarse positioning and establish its coordinate relationship with the fitted straight line search area, and finally use the least squares method in the corresponding fitted line search area to fit the touch screen to get the center c of Circle in area A and the center d of Circle in area B;

taking a line passing through the center point a and b as X-axis and a vertical line passing through the center point a as Y-axis; the coordinates of the two pairs of Mark marks are unified in one coordinate system, and the coordinates of the four points are obtained, so as to obtain the relative deviation position between the Mark point and the Circle.

2. The non-contact visual detection method for Mark positioning of mobile phone touch screen according to claim 1, wherein the calibration of the camera image use a grid of 0.5 mm*0.5 mm checkerboard and use the least squares method in the corresponding fitted line search area to fit the four boundaries of Mark at both ends of the touch screen, so that the coordinates of two intersecting points (X1, Y1) and (X2, Y2) can be obtained and the coordinates of Mark's central point can be calculated by the following formula:

$$\begin{cases} a = (X1 + X2)/2 \\ b = (Y1 + Y2)/2 \end{cases}.$$

* * * * *